(12) United States Patent
Rajamani et al.

(10) Patent No.: US 8,674,935 B2
(45) Date of Patent: Mar. 18, 2014

(54) SYSTEM DELAY MITIGATION IN INTERACTIVE SYSTEMS

(75) Inventors: Krishnan Rajamani, San Diego, CA (US); Samir S. Soliman, San Diego, CA (US); Vijayalakshmi Raveendran, San Diego, CA (US); Judit Martinez Bauza, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1004 days.

(21) Appl. No.: 12/603,344

(22) Filed: Oct. 21, 2009

(65) Prior Publication Data

US 2011/0090144 A1    Apr. 21, 2011

(51) Int. Cl.
*G09G 5/00* (2006.01)
*G06F 3/033* (2013.01)
*G09G 5/08* (2006.01)
*A63F 9/24* (2006.01)
*G10L 19/00* (2013.01)
*G06F 7/00* (2006.01)

(52) U.S. Cl.
USPC ............. 345/156; 463/42; 704/500; 707/740; 345/158

(58) Field of Classification Search
USPC ........................................................ 345/156
See application file for complete search history.

(56) References Cited

U.S. PATENT DOCUMENTS

| | | | |
|---|---|---|---|
| 6,384,821 B1 | 5/2002 | Borrel et al. | |
| 2002/0142843 A1* | 10/2002 | Roelofs | 463/42 |
| 2004/0021948 A1 | 2/2004 | Blasi et al. | |
| 2005/0240414 A1* | 10/2005 | Tominaga | 704/500 |
| 2006/0020974 A1 | 1/2006 | Birnbaum et al. | |
| 2009/0040179 A1* | 2/2009 | Lee et al. | 345/158 |
| 2010/0063969 A1* | 3/2010 | Kasargod et al. | 707/740 |

FOREIGN PATENT DOCUMENTS

| | | |
|---|---|---|
| EP | 1086731 A2 | 3/2001 |
| JP | 2004523326 A | 8/2004 |
| JP | 2007299706 A | 11/2007 |
| JP | 2008125721 A | 6/2008 |
| JP | 2008272448 A | 11/2008 |
| JP | 2009119146 A | 6/2009 |
| JP | 2009230585 A | 10/2009 |
| JP | 2010220878 A | 10/2010 |
| JP | 2010273946 A | 12/2010 |
| WO | WO 2007120741 A2 | 10/2007 |

OTHER PUBLICATIONS

Geri. "Wireless HDTV—Compressed or Uncompressed? That is the Question . . .", AMIMON LTD, Nov. 2006, 8 pages.
International Search Report and Written Opinion -PCT/US2010/053531- International Search Authority, European Patent Office,Jan. 27, 2011.
Yahn W Bernier: "Latency Compensation Methods in Client/Server In-Game Protocol Design and Optimization", Internet Citation, Mar. 20, 2001, XP002347952, Retrieved from the Internet: URL:http://developer.valvesoftware.com/wiki/Latency_Compensating_Methods_in_Client/Server_In-game_Protocol_Design_and_Optimization [retrieved on Oct. 6, 2005] section "Lag Compensation"; p. 11-p. 12.

* cited by examiner

*Primary Examiner* — Charles V Hicks
(74) *Attorney, Agent, or Firm* — Donald C. Kordich

(57) ABSTRACT

A method sends a signal to render visual information on a display, and receives a user response to the rendered visual information. The user response includes a first delay. The method also queries an electronic system for data indicating a second delay. The second delay is a portion of the first delay and attributable to the electronic system. The method further using the data indicating the second delay to compensate for electronic system delay during interactions with a user.

27 Claims, 4 Drawing Sheets

SYSTEM DELAY MITIGATION IN INTERACTIVE SYSTEMS

BACKGROUND

1. Field

The present disclosure is related, generally, to interactive electronic systems and, more specifically, to mitigating effects of system delay in interactive electronic systems.

2. Background

Game applications typically run on a host console/computer which renders the output of the game on a display attached via wires to the host platform. As such, the system delay incurred between the instant that the game application submits a frame to be displayed, and the instant that it is visible to the game player is usually not humanly perceptible and usually negligible relative to the subsequent human delay in responding to this visual stimulus via a joystick or other Human Interface Device (HID). Typical game applications assume that the delay between the instant a frame update is submitted to the Operating System (OS)/graphics subsystem and the instant HID response is received from the game player is largely the game player's delay (a function of the user's hand eye coordination). This delay may be used to judge the player's response and may influence subsequent decisions made by the game application. If a significant portion of this intervening delay is caused by end-to-end system latency in rendering the frame, then the above assumption is not valid, and the game player may be unfairly penalized.

Currently, wireless display technology is developing and beginning to be commercialized. A typical wireless display includes a wireless host and a wireless client, which receives the signals from the wireless host and renders the visual information on a display. Conventional wireless display systems introduce some amount of humanly perceptible delay.

One approach to mitigate the effects of wireless display system delay is to minimize the delay as much as possible. One way to minimize delay is to use high bandwidth wireless links, such as 60 GHz links over multiple antennas. Use of high bandwidth links may eliminate the need to compress the frames before they are transmitted to the display, where compression and decompression are usually expected to be a contributor to delay. However, such solution may not be suitable for battery powered devices, which may not be able to output uncompressed video over the air or practically support a large number of antennas.

SUMMARY

According to one embodiment, a method comprises receiving a user response to visual information, the user response including a first delay. The method also includes querying an electronic system for data indicating a second delay, the second delay being a portion of the first delay and attributable to the electronic system. The method further includes using the data indicating the second delay to compensate for electronic system delay during interactions with a user.

According to another embodiment, an electronic system comprises a user interface device in communication with a Human Interface Device (HID) and a display subsystem. The user interface device comprises a visual generation unit sending signals to the display subsystem to render visual stimulus. The user interface device also includes a user interaction unit receiving responses associated with the visual stimulus, querying at least one portion of the electronic system for data indicating delay of the electronic system, and adjusting interactions with the user in response to the data indicating delay.

In another embodiment, a system comprises means for interacting with a user. The interacting means include means for controlling a device to render data to the user, means for receiving user response to the rendered data, means for discerning an amount of delay in the user response attributable to at least one electronic subsystem, and means for compensating for the delay attributable to the at least one electronic subsystem.

In yet another embodiment, a computer program product tangibly embodying a computer readable medium having computer program logic recorded thereon comprises code that receives a user response to a stimulus. The logic also has code that discerns a portion of delay in the user response that is attributable to an electronic system, and code that ameliorates the effects of the delay attributable to the electronic system in interactions with the user.

In another embodiment, a system comprises a video game system in communication with a Human Interface Device (HID) and a display system. The video game system queries the HID and display system for information associated with latency attributable to the HID and display system, respectively, and uses the information associated with latency to adjust interactions with a human user.

In another embodiment, a system comprises a display subsystem. The display subsystem includes a host unit and a client unit that has a display panel. The host unit communicates with an Application Programming Interface (API) from a requesting unit, queries the client unit for latency attributable to the client unit in response to the API, calculates an aggregated display subsystem latency using the latency attributable to the client unit, and sends information indicating the aggregated display subsystem latency to the requesting unit.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

Figure 1:
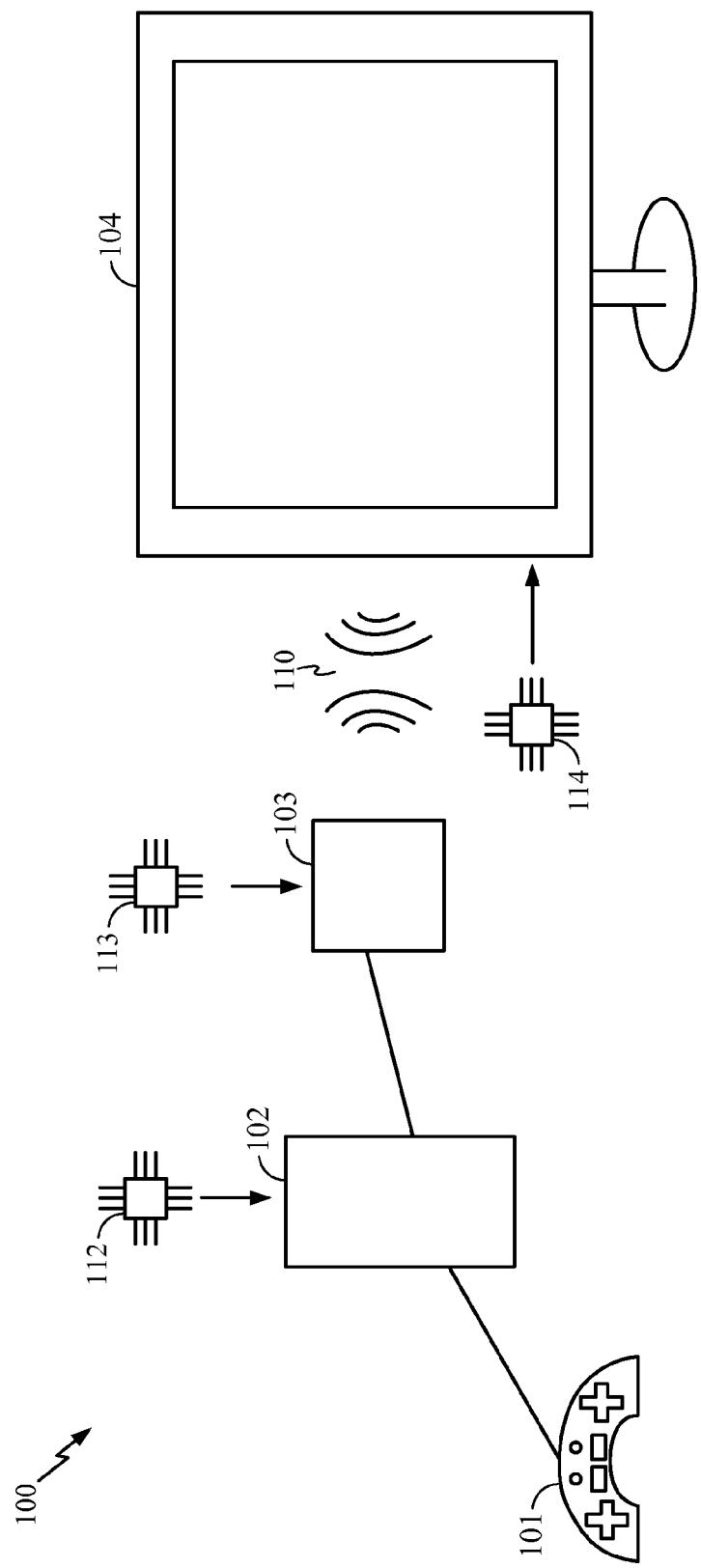
FIG. 1 is an illustration of an exemplary system adapted according to one embodiment of the disclosure.

FIG. 1 is an illustration of the exemplary system 100 adapted according to one embodiment of the disclosure. The system 100 includes a user interaction console 102, an example of which may include a video game console or other interactive device. A user interacts with the user interaction console 102 through use of the HID 101, which is shown as a keypad, but may also include a joystick or any other wired or wireless controller.

The user interaction console 102 exchanges control signals with, and transmits media signals to, the display host 103. For instance, in a video game system example, the user interaction console 102 sends sound and video signals to the display host 103 to be rendered upon the display 104. Video signals are typically rendered as frames, though any technique to render visual information on a display is within the scope of embodiments.

The display host 103 communicates with the display client 104 using the wireless link 110. Examples of wireless links that can be adapted for use in embodiments include white space channels, IEEE 802.11 links, Ultra Wideband (UWB) links, Bluetooth™ links, and the like. In this example, the display host 103 receives audio and video signals from the user interactive console 102, compresses and encodes the signals, and transmits the signals to the display client 104. The display client 104 then decompresses and decodes the signals, processes the signals, and presents the audio and video information on a screen and speakers.

In FIG. 1, the link 110 is shown as a wireless link, and the links between the devices 102 and 103 and between the devices 102 and 101 are shown as wired links. However, it is within the scope of embodiments that a given link can be wired or wireless. Furthermore, while the various components of the system 100 are shown as separate, it is within the scope of embodiments that one or more such components may be integrated into one or more devices. For instance, one embodiment includes a video game console that is in communication with a separate wireless display subsystem. In another embodiment, a computer includes the user interaction console 102 and the display host 103 in communication with a stand-alone wireless display.

The functionality of the user interaction console 102, the display host 103, and the display client 104 is described in more detail below. Such functionality can be performed by hardware or software and in many embodiment is provided by one or more computer processors executing code that is saved to a computer readable storage medium. In some embodiments, a computer processor and memory with code stored thereon providing the functionality are included in a chipset for installation in any of a variety of devices. The functionality of the system 100 is provided by the chipsets 112, 113, and 114, which are installed in the user interaction console 102, the display host 103, and the display client 104, respectively. Furthermore, various functionality of the user interaction console 102 may be provided by computer executable code (e.g., video game code) written to computer-readable media, such as a game cartridge, a Universal Serial Bus (USB) flash drive, a Digital Video Disc (DVD) or Compact Disc (CD) Read Only Memory (ROM), internal Random Access Memory (RAM) and/or ROM or the like.

The system 100 experiences humanly-perceptible delay due to the processing of the signal by the display host 103 and the display client 104. Specifically, the system 100 experiences some amount of latency attributable to the encoding/decoding, compression/decompression, and transmission of the signal. Additional latency, though negligible compared to the wireless display system latency, is attributable to the HID 101 and processing performed by the user interactive console 102.

Figure 2:
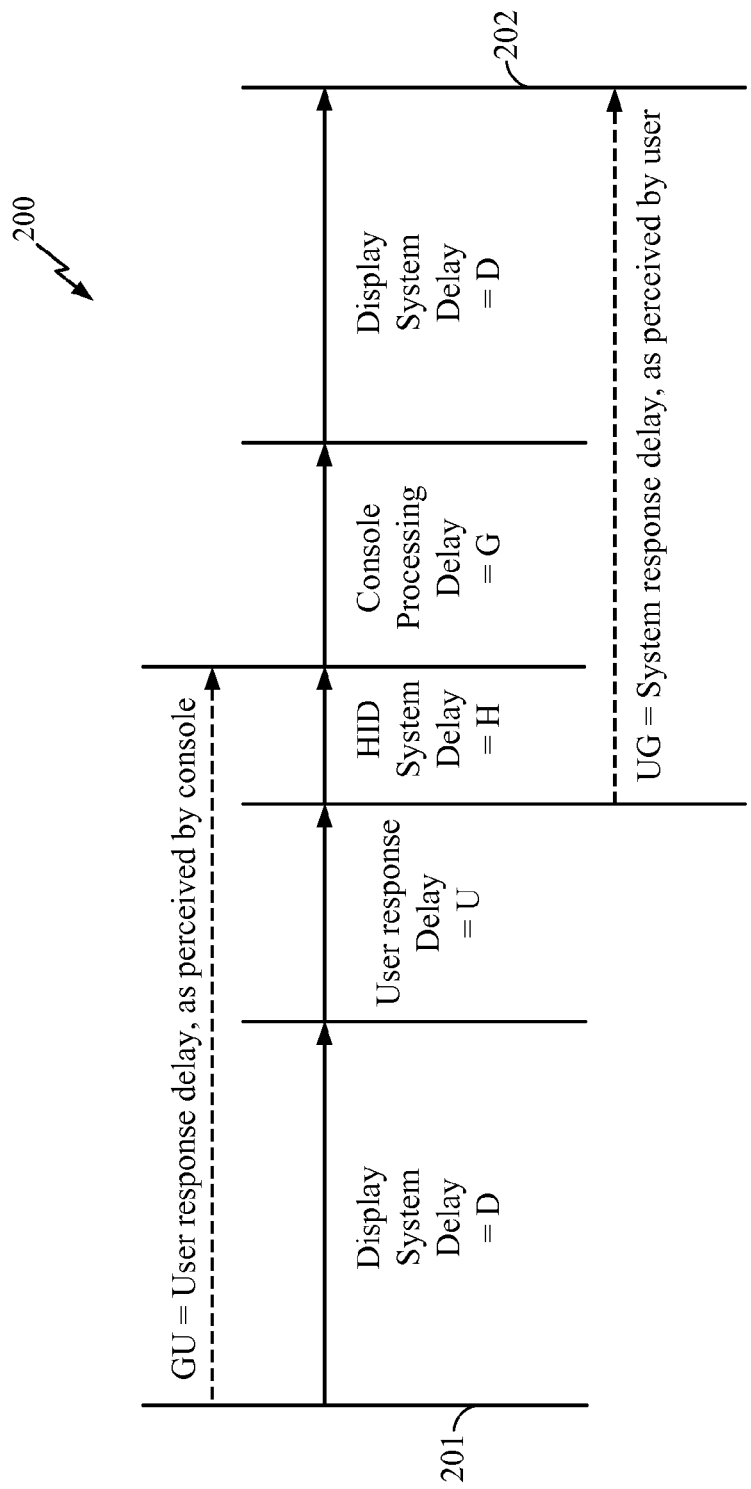
FIG. 2 is an illustration of delay that can be present in a system, such as the system of FIG. 1.

FIG. 2 is an illustration of delay that can be present in a system, such as the system 100 of FIG. 1. Moving from left to right across the timeline 200, the leftmost time 201 is when the user interaction console sends signals to render visual data on the display. There is a first elapsed time, D, which is the display system delay. For a wired system, the display system delay, D, is usually smaller than it would be for a wireless display subsystem. There is also the user response delay, U, that is from the time the frame is rendered onto the raster until the user responds. The HID system delay, H, is the delay from when the user presses a button or otherwise interacts with an HID to when the user interaction console receives the user response. The user interactive console processes the user response, incurring console processing delay, G, and renders the next frame at time 202. Rendering the next frame also incurs the next the display system delay, D (which may or may not be the same as the first display system delay, $D_1$). Perceived user response delay, GU, is the delay from when the frame was rendered to when the user response was perceived by the user interactive console. The perceived system response delay, UG, is the system response delay as perceived by the user.

In a perfect system, the HID system delay, H, is zero and the display system delay, D, is zero, and the user interactive console (or the underlying interactive application, e.g., video game software) can assume that the user response delay, GU, is equal to U. In some instances when the perceived user response delay, GU, is very small, it is acceptable to assume that the perceived user response delay, GU, equals the user response delay, U. However, when the display system delay, D, or the HID system delay, H, are large, then it is typically not acceptable to assume that the perceived user response delay, GU, equals the user response delay, U, especially in a fast-paced video game. In various embodiments, the user interactive console subtracts the display system delay, D, and the HID system delay, H, from the perceived user response delay, GU, to accurately estimate the user component of the delay in order to assess the user's response. An additional issue is that when the user interacts with the HID, the user often expects instantaneous response from the console. Whether the console reacts quickly (or not), if the perceived system response delay, UG, is large, the user may perceive the console as being sluggish. However, such issue is not addressed by the present disclosure.

Figure 3:
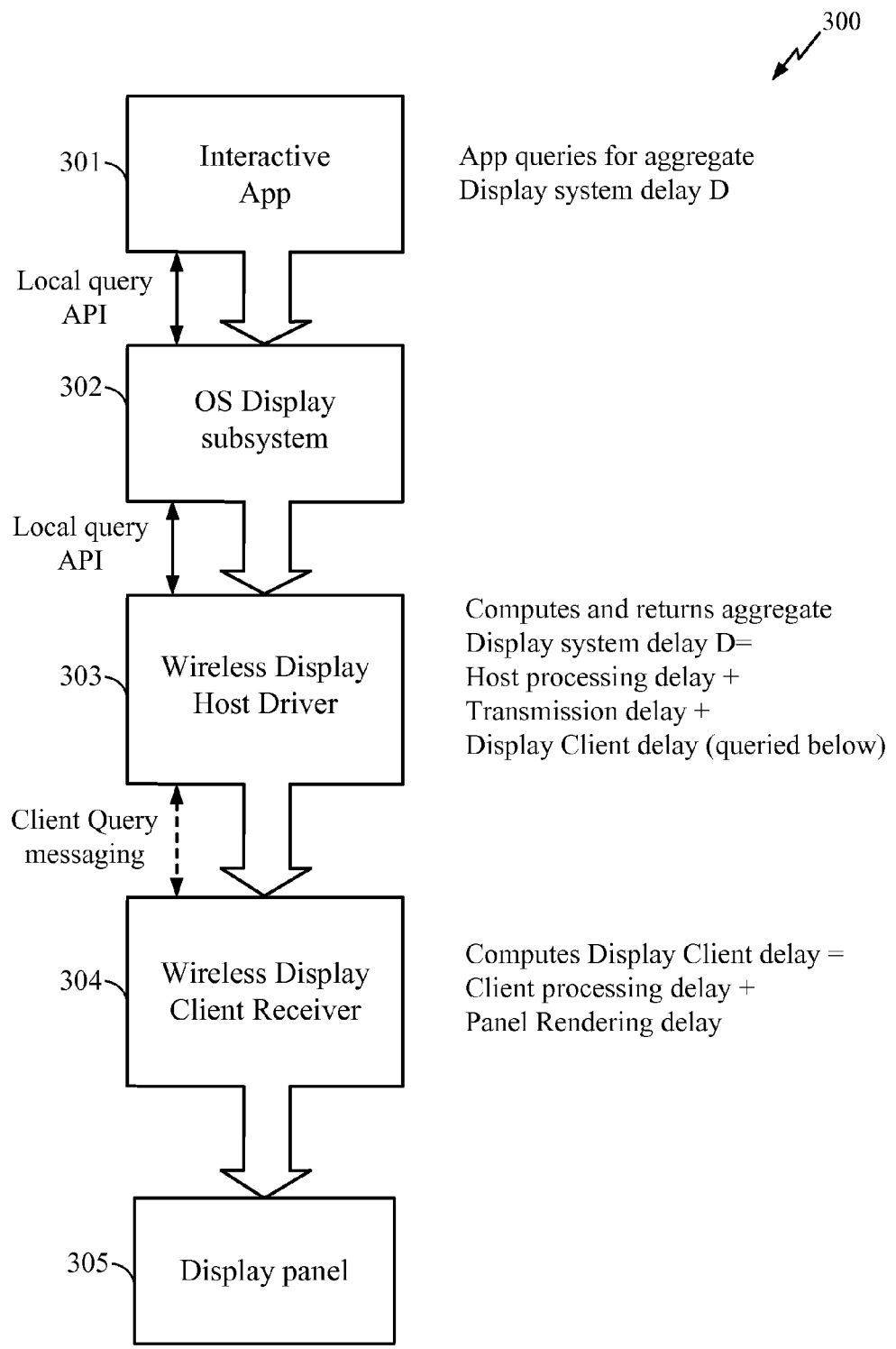
FIG. 3 is an illustration of an exemplary process, adapted according to an embodiment.

FIG. 3 is an illustration of the exemplary process 300, adapted according to an embodiment. The process 300 may be performed, for example, by a system, such as the system 100 of FIG. 1. The process 300 includes actions between and among various functional units, such as the interactive application 301 (e.g., a software application (for example a game) running on a user interactive console), the OS Display subsystem 302, (e.g., a unit of the OS of the user interactive console or the display subsystem host), the wireless display host driver 303 of the display host, the wireless display client receiver 304, and the display panel 305. FIG. 3 shows use of a wireless display, though the concept shown in FIG. 3 for discerning display delay can be applied to systems using wired displays as well.

The interactive user application 301 makes an interface call (via an Application Programming Interface—API) to query for the aggregate display system delay, D, to be factored out of the perceived user response delay, GU, computation. The OS display subsystem 302, in this example using a wireless display, includes an interface to a wireless subsystem that communicates with the wireless display. The interactive user application 301 queries the OS Display subsystem 302 using a local API, and the OS Display subsystem 302 returns the value of the aggregate display system delay, D.

In this example, the OS Display subsystem 302 does not, itself, know the value of the aggregate display system delay, D, because the aggregate display system delay, D, is an aggregate delay that includes delay from the wireless display host driver 303 and the wireless display client receiver 304. For instance: the wireless display host driver 303 itself does some processing, e.g., compression; wireless transmission involves delay, such as medium access delays; and the wireless display client receiver 304 performs decoding, which involves delay. The raster in the display panel 305 also has some delay. In a scenario in which the various components are from one vendor, it is possible that the different delays may be known a priori. By contrast, in a system where the display is from one vendor, and the user interactive console is from another vendor, client messaging can query the various components to calculate the various components of the delay, as shown in FIG. 3.

The OS Display subsystem 302 sends a query using an API to the wireless display host driver 303 to inquire about the aggregate display system delay, D, which in this example includes host processing delay plus transmission delay plus client processing delay and panel rendering delay (e.g., raster delay). Client processing delay and panel rendering delay are attributable to the wireless display client receiver 304 and the display panel 305. The wireless display host driver 303 and the wireless display client receiver 304 use bi-directional client messaging to eventually deliver the receiver delay information to the wireless display host driver 303. The wireless display host driver 303 then computes the sum of host processing delay, transmission delay, and the delay attributable to the wireless display client receiver 304 and the display panel 305. The wireless display host driver 303 then passes information indicating the aggregate display system delay, D, to the OS Display subsystem 302, which passes the information to the interactive user application 301.

The process 300 can be performed at any of a variety of times by various embodiments. For instance, the process 300 can be performed with each frame, once each gaming session, at regular intervals, or the like. If the aggregate display system delay, D, varies significantly from frame to frame, it may be desirable to perform the process 300 at regular intervals, such as once per frame, but if the variation is smaller, less frequent performing of the process 300 reduces overhead. In many cases, it can be assumed that the variation of delay between frames is insignificant when the encode delays do not vary significantly. However, delays attributable to transmission may vary depending on, e.g., how much content is being transmitted. The APIs used can be synchronous or asynchronous (with a callback or event posted with the result) and may be invoked independently of the calls to render the display data. Additionally or alternatively, the queries may be combined with the OS calls to render the display data.

Figure 4:
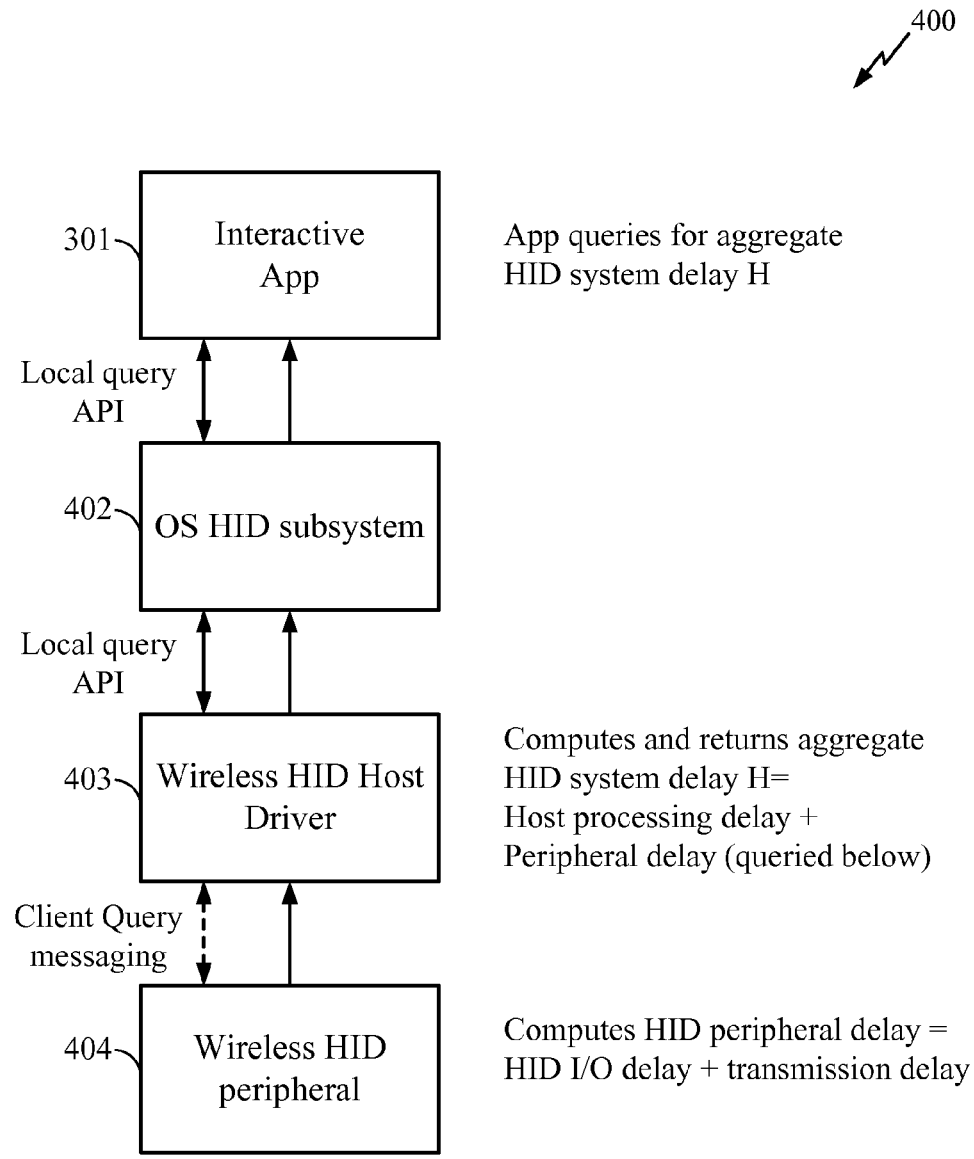
FIG. 4 is an illustration of an exemplary process, adapted according to an embodiment.

FIG. 4 is an illustration of the exemplary process 400, adapted according to an embodiment. The process 400 is similar to the process 300, except that the process 400 is a technique to calculate the delay, referred to in FIG. 2 as HID system delay, H, attributable to the HID. In some embodiments the HID is a wireless device that has significant attributable delay. On the other hand, in some embodiments the HID is a device with little attributable delay. In either case, the process 400 can be performed by the interactive user application 301 to discern HID system delay, H, so the user-attributable delay can be calculated. FIG. 4 shows use of a wireless HID, though the concept shown in FIG. 4 for discerning HID delay can be applied to systems using wired HIDs as well.

The interactive user application 301 sends a query to the OS HID subsystem 402 requesting information about the delay attributable to the HID. The OS HID subsystem 402 then sends a query by API to the wireless HID host driver 403. The aggregate HID delay, H, includes host processing delay and peripheral delay. Peripheral delay is attributable to the wireless HID peripheral 404, itself, and includes input/output delay and transmission delay. The wireless HID host driver 403 and the wireless HID peripheral 404 use bi-directional query messaging to deliver information indicating delay attributable to the wireless HID peripheral 404 to the wireless HID host driver 403. The wireless HID host driver 403 then calculates the aggregate HID delay, H, and sends information indicating HID system delay, H, to the OS HID subsystem 402, which passes the information to the interactive user application 301.

In a system where the user interactive console and the HID are from the same vendor, the HID delay may be known a priori. On the other hand, when the user interactive console and the HID are from different vendors (are or otherwise unknown), the process 400 may be performed.

Similar to the process 300, the process 400 can be performed at startup, at every frame, at regular intervals, and the like. Embodiments can perform the methods 300 and/or 400 to adapt to changing system configurations, changing bandwidth and computing demands, and other factors that affect delay.

Once the interactive user application 301 has information indicating both aggregate display system delay, D, and HID system delay, H, the interactive user application 301 can derive which delay is system delay and which delay is user delay. Such derived information can then be used by the user interactive console to mitigate the effects of the system delay. In one example, the user interactive console adjusts its interactions with the user by disregarding calculated system delay when judging the user's responses. In the context of a video game, the reward or penalty given to the user as a function of the user's response is adjusted so as not to penalize the user for system delay. In other words, such an example system compensates for its own delay.

While some of the examples given above are in the context of video gaming, not all embodiments are so limited. Various embodiments may be adapted for use with video gaming systems, and other embodiments may be adapted for use in any of a variety of other applications where user delay affects interactions. For instance, embodiments may be implemented in personal computers that utilize Graphical User Interfaces (GUIs) to more precisely calculate the context of a user's mouse movements or key strokes. An additional example includes implementing an embodiment in a wireless touch display calibration unit to account for system delay when detecting multi-touch gestures.

Various embodiments include advantages over other techniques. For instance, various embodiments may be better adapted for use with battery-powered devices than more power intensive systems that use high-bandwidth links to reduce delays. Furthermore, embodiments using closed loop techniques with queries and responses may be adaptable for use with different host platforms, transmission link types, and display platform implementations.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   receiving a response to visual information, the response including a first delay;
   querying an electronic system for data indicating a second delay, the second delay being a portion of the first delay and attributable to the electronic system, and comprising an aggregate display delay which comprises a host wireless transmission delay and at least one of host processing delay, client wireless processing delay, or display panel rendering delay; and
   using the data indicating the second delay to compensate for electronic system delay during interactions with a user.

2. The method of claim 1 performed by a processor-based game console.

3. The method of claim 1 wherein the second delay comprises:
   latency attributable to a wireless display unit that is part of the electronic system.

4. The method of claim 1 wherein the second delay comprises:
   latency attributable to a Human Interface Device (HID) that is part of the electronic system, the HID providing the response.

5. The method of claim 1 wherein the electronic system comprises a wireless host controlling a wireless display, and wherein querying the electronic system comprises:
   using an Application Programming Interface (API) to send a request to the wireless host to calculate the aggregate display delay that is a portion of the second delay.

6. The method of claim 1 wherein the host processing delay comprises encoding and compression delay, and wherein the client wireless processing delay includes decoding and decompressing delay.

7. The method of claim 1 wherein the electronic system comprises a wireless host controlling a wireless display, wherein the wireless host and wireless display comprise devices from different manufacturers, and wherein querying the electronic system comprises:
   using an Application Programming Interface (API) to send a request to the wireless host to calculate an aggregate display delay that is a portion of the second delay.

8. The method of claim 1, wherein the data indicating the second delay is used to calculate a delay attributable to the user.

9. The method of claim 1, wherein using the data indicating the second delay comprises:
   discerning an amount of the first delay not attributable to the user; and
   determining whether to penalize or reward the user for the received response based upon delay attributable to the user.

10. An electronic system comprising:
    a user interface device in communication with a Human Interface Device (HID) and a display subsystem, the user interface device comprising:
      a visual generation unit sending signals to the display subsystem to render visual stimulus; and
      a user interaction unit receiving responses associated with the visual stimulus, querying at least one portion of the electronic system for data indicating delay of the electronic system, wherein the delay comprises an aggregate display delay which comprises a host wireless transmission delay and at least one of host processing delay, client wireless processing delay, or display panel rendering delay, and adjusting interactions with a user in response to the data indicating delay.

11. The electronic system of claim 10, wherein the display subsystem comprises a wireless display host in communication with the user interface device and a wireless display client.

12. The electronic system of claim 11, wherein the delay of the electronic system comprises delay attributable to the wireless display host and the wireless display client.

13. A system comprising:
    means for interacting with a user, including:
      means for controlling a device to render data to the user;
      means for receiving user response to the rendered data;
      means for discerning an amount of delay in the user response attributable to at least one electronic subsystem, the delay comprising an aggregate display delay which comprises a host wireless transmission delay and at least one of host processing delay, client wireless processing delay, or display panel rendering delay; and
      means for compensating for the delay attributable to the at least one electronic subsystem.

14. The system of claim 13, wherein the means for discerning an amount of delay comprise:
    means for using an Application Programming Interface (API) to request latency information from a display subsystem.

15. The system of claim 13, wherein the means for discerning an amount of delay comprise:
    means for using an Application Programming Interface (API) to request latency information from a Human Interface Device (HID).

16. The system of claim 13 comprising a video game console in communication with a display subsystem.

17. A computer program product tangibly embodying a non-transitory computer readable medium having computer program logic recorded thereon, the computer program product comprising:
    code that receives a user response to a stimulus;
    code that discerns a portion of delay in the user response that is attributable to an electronic system, the delay comprising an aggregate display delay which comprises a host wireless transmission delay and at least one of host processing delay, client wireless processing delay, or display panel rendering delay; and
    code that ameliorates effects of the delay attributable to the electronic system in interactions with a user.

18. The computer program product of claim 17 wherein the code that discerns a portion of delay comprises:
    an Application Programming Interface (API) querying the electronic system for latency attributable to a display subsystem.

19. The computer program product of claim 17 comprising a video game application.

20. The computer program product of claim 17 wherein the code that discerns a portion of delay comprises:
  code that discerns latency attributable to a Human Interface Device (HID).

21. A system comprising:
  a video game system in communication with a Human Interface Device (HID) and a display system, the video game system querying the HID and display system for information associated with latency attributable to the HID and display system, respectively, wherein the latency attributable to the display system comprises a host wireless transmission delay and at least one of host processing delay, client wireless processing delay, or display panel rendering delay, and using the information associated with latency to adjust interactions with a human user.

22. The system of claim 21 wherein the video game system is in communication with a wireless display system.

23. The system of claim 21 wherein the video game system comprises a video game console.

24. The system of claim 21, wherein the video game system queries the HID and display system using Application Programming Interfaces (APIs).

25. A system comprising:
  a display subsystem including:
    a host unit; and
    a client unit with a display panel, the host unit communicating with an Application Programming Interface (API) from a requesting unit, querying the client unit for latency attributable to the client unit in response to the API, wherein the latency attributable to the client unit comprises client wireless processing delay and display panel rendering delay, calculating an aggregated display subsystem latency using the latency attributable to the client unit, and sending information indicating the aggregated display subsystem latency to the requesting unit.

26. The system of claim 25 wherein the host unit and client unit communicate wirelessly.

27. The system of claim 25 wherein the host unit queries the client unit using bi-directional client query messaging.

* * * * *